United States Patent
Gramlich

(10) Patent No.: US 6,332,429 B1
(45) Date of Patent: Dec. 25, 2001

(54) PET LITTER CONTAINER

(75) Inventor: Theodore Gramlich, Vancouver (CA)

(73) Assignee: Theodore International Corporation, Bahama Islands (BS)

( * ) Notice: Subject to any disclaimer, the term of this patent is extended or adjusted under 35 U.S.C. 154(b) by 0 days.

(21) Appl. No.: 09/262,308

(22) Filed: Mar. 4, 1999

(51) Int. Cl.[7] .................................................. A01K 29/00
(52) U.S. Cl. ............................................................. 119/165
(58) Field of Search .................................. 119/161, 162, 119/165, 166, 167, 168

(56) References Cited

U.S. PATENT DOCUMENTS

| | | | |
|---|---|---|---|
| 2,741,223 | * 4/1956 | Winborn, Jr. | 119/165 |
| 3,310,031 | * 3/1967 | Lowe, Jr. | 119/165 |
| 3,990,396 | * 11/1976 | Turk | 119/165 |
| 3,990,397 | * 11/1976 | Lowe, Jr. | 119/165 |
| 4,027,625 | * 6/1977 | Wheeler | 119/165 |
| 4,271,544 | * 6/1981 | Hammond | 119/165 |
| 4,649,578 | * 3/1987 | Vargo | 119/165 |
| 4,766,845 | * 8/1988 | Bavas | 119/165 |
| 4,967,692 | * 11/1990 | Mills | 119/168 |
| 5,042,430 | * 8/1991 | Casmira | 119/165 |
| 5,184,574 | * 2/1993 | Kirk et al. | 119/162 |
| 5,454,349 | * 10/1995 | Bondurant | 119/166 |
| 5,507,252 | 4/1996 | Ebert | 119/166 |
| 5,655,478 | * 8/1997 | Kiera | 119/165 |
| 5,749,318 | 5/1998 | Barbot et al. | 119/166 |
| 5,752,465 | 5/1998 | Page | 119/166 |
| 5,752,466 | 5/1998 | Lundeen et al. | 119/167 |
| 5,785,001 | 7/1998 | Robinson | 119/168 |
| 5,799,610 | * 9/1998 | Poulos | 119/166 |
| 5,832,869 | * 11/1998 | Franczak et al. | 119/168 |
| 5,988,108 | * 11/1999 | Silver | 119/166 |

* cited by examiner

Primary Examiner—Thomas Price
(74) Attorney, Agent, or Firm—Oyen Wiggs Green & Mutala

(57) ABSTRACT

This application relates to an improved container for holding pet litter. The container has a bottom surface and an outer wall extending upwardly from the perimeter of the bottom surface. The container also has an inner wall coupled to or seated on the outer wall and supported above the bottom surface. The container is partially filled with pet litter to a level below the bottom edge of the inner wall. The inner wall extends adjacent to and inwardly of the outer wall and functions as a urine splashguard, thereby preventing litter clumps from sticking to the outer wall and fouling it. This eliminates the need to dump the entire contents of the container in order to clean the outer wall. In one embodiment of the invention, the inner wall is pivotably and removably coupled to the outer wall. In another embodiment the inner wall has an upper rim which is supported on an upper edge of the outer wall.

22 Claims, 5 Drawing Sheets

PET LITTER CONTAINER

TECHNICAL FIELD

This application relates to an improved container for holding pet litter. The invention prevents clumps of pet litter from sticking to the walls of the container.

BACKGROUND

Cleaning pet litter boxes is an unpleasant and potentially unsanitary chore. Consequently various "self-cleaning" litter containers are known in the prior art to facilitate removal of animal waste and reuse of the container. For example, U.S. Pat. No. 5,752,465, which issued to Page on May 19, 1998, relates to a pet litter holding device which includes a stationary base, a rotatable drum and a sieving panel which isolates solid and clumped litter during rotation of the drum. The waste material is directed to an exit spout adapted to hold a disposable plastic bag. The following United States patents disclose other similar devices for filtering and disposing animal waste:

| U.S. Pat. No. | Issue Date | Title | Inventor(s) |
|---|---|---|---|
| 5,507,252 | April 16, 1996 | Waste Separating Cat Litter Box | Ebert |
| 5,749,318 | May 12, 1988 | Self-filtering Litter Box for Animals | Barbot et al. |
| 5,752,466 | May 19, 1998 | Clumping Litter Liner-Sieve System | Lundeen et al. |
| 5,799,610 | Sept. 1, 1998 | Self-Filtering Litter Box for Pets | Poulos |

Although many reusable pet litter containers facilitate filtering and removal of waste material, they do not eliminate the need for pet owners to periodically clean the walls or sides of the container. Adherence of clumping-type pet litter to container walls is a problem which is common to both conventional and self-cleaning devices. Most cats tend to urinate on or near the end walls or in the corners of litter containers, which are usually rectangular-shaped. Typically it is necessary to use a litter scoop or some other instrument as a scraper to dislodge clumps of pet litter from the container walls. This is an unpleasant job and often results in pet litter plugging the sifter holes of the litter scoop. Moreover, a thin layer of wet litter remains on the container walls which retains odour and is unsanitary. Cleaning is particularly difficult if the container has a litter containment hood which cannot be easily removed.

The need has therefore arisen for a pet litter container which is specifically designed to prevent litter from sticking to the walls of the container.

SUMMARY OF THE INVENTION

In accordance with the invention, an improved pet litter container is disclosed. The container includes an enclosure for holding pet litter, the enclosure having a bottom surface and an outer wall extending upwardly from the bottom surface. The container also includes an inner wall coupled to the outer wall, wherein the inner wall is supported in an upright position within the enclosure at a location above the bottom surface.

In a first embodiment of the invention, the inner wall is subdivided into a plurality of separate inner wall sections each of which is pivotably coupled to a portion of the outer wall for movement between the upright position and a folded position. In the folded position the inner wall sections are preferably positioned outwardly of the enclosure.

The inner wall sections may also be removably coupled to the outer wall for quick removal and ease of cleaning. Optionally the height of the inner wall above the bottom surface is selectively adjustable.

In a second embodiment of the invention the inner wall is formed in one piece. In this embodiment the uppermost portion of the inner wall flares upwardly and outwardly at an angle and then extends horizontally to form a rim which is removably seated on the upper edge of the outer wall.

The container may also optionally include a hood for covering the enclosure. The hood is removably connectable to either the outer wall in the first embodiment of the invention or the unitary inner wall in the second embodiment of the invention. The hood includes an opening in a side portion thereof to provide access to the interior of the container.

BRIEF DESCRIPTION OF DRAWINGS

In drawings which describe embodiments of the invention, but which should not be construed as restricting the spirit or scope thereof.

DESCRIPTION

Figure 1:
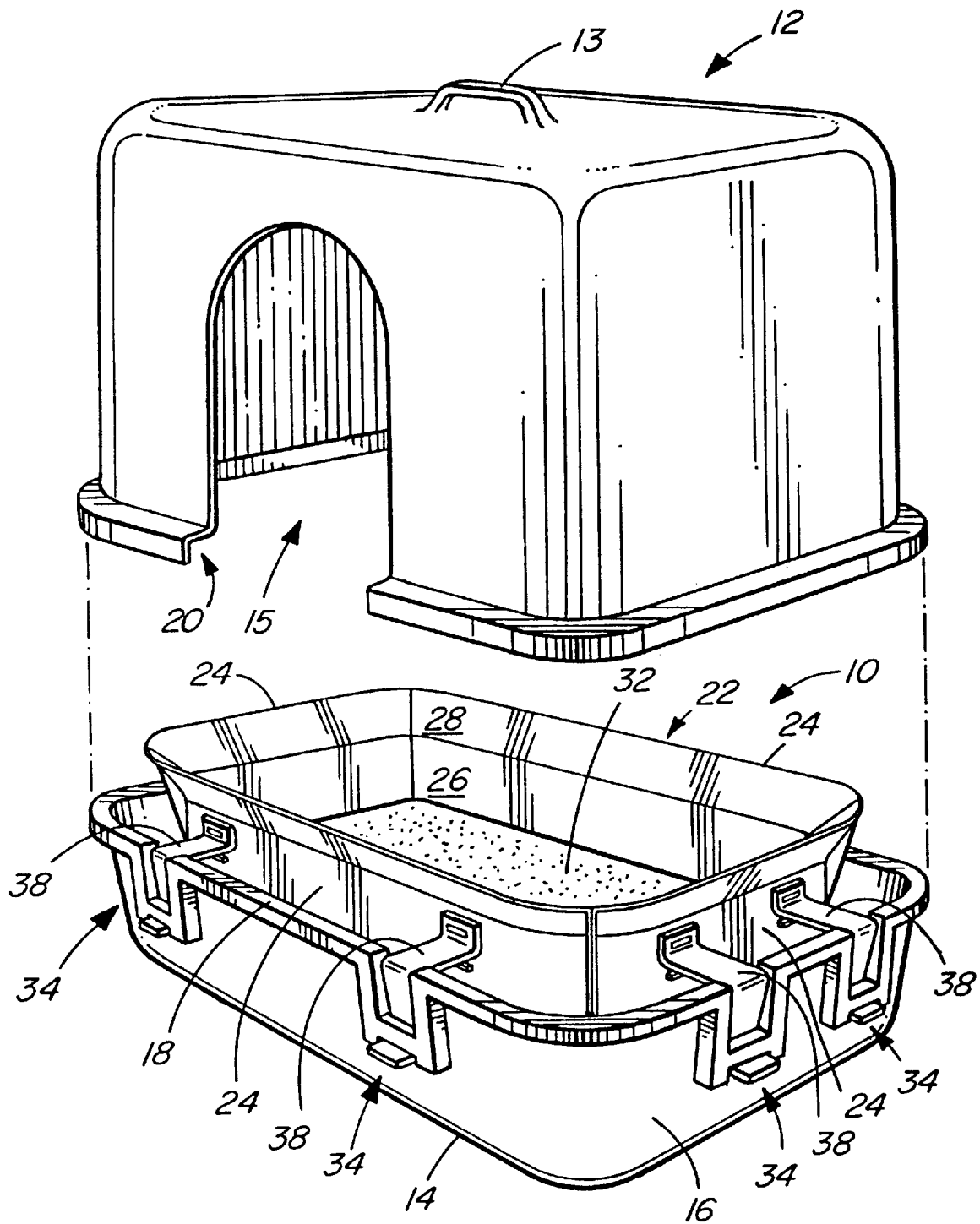
FIG. 1 is an isometric, partially exploded view of the applicant's pet litter container and hood assembly showing the inner wall sections in the upright position.

As shown in FIG. 1, the applicant's invention relates to a pet litter container 10 and a removable hood 12. Container 10 includes a bottom surface 14 and an outer wall 16 extending upwardly from the perimeter of bottom surface 14. Outer wall 16 may include rounded corners and a flat upper rim 18. Hood 12 has a peripheral channel 20 which fits on and over rim 18 when container 10 and hood 12 are assembled together. Hood 12 also includes a handle 13 and a door opening 15.

Figure 2:
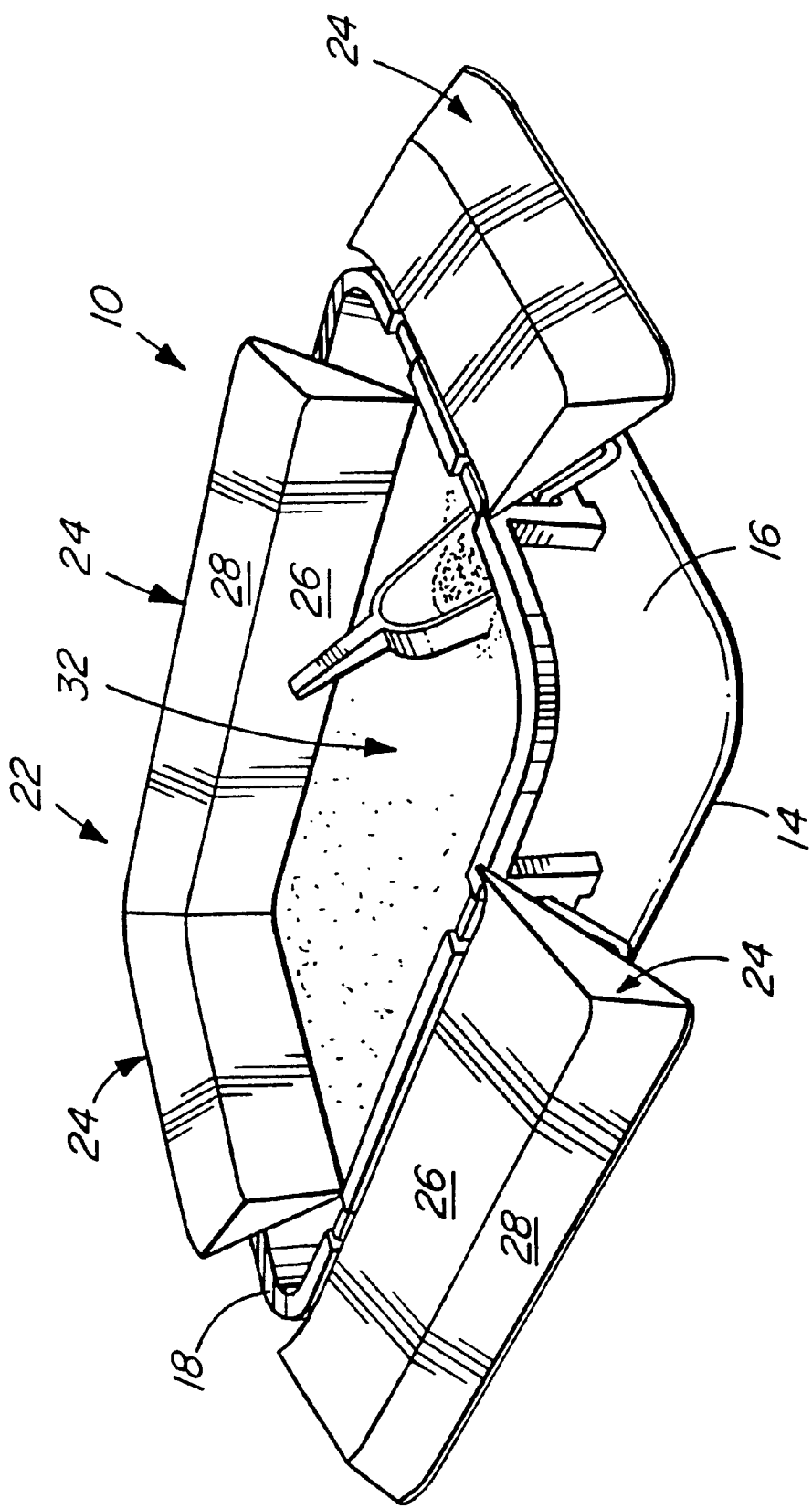
FIG. 2 is an isometric view of the container of FIG. 1 showing two of the inner wall sections pivoted to folded positions.
Figure 5:
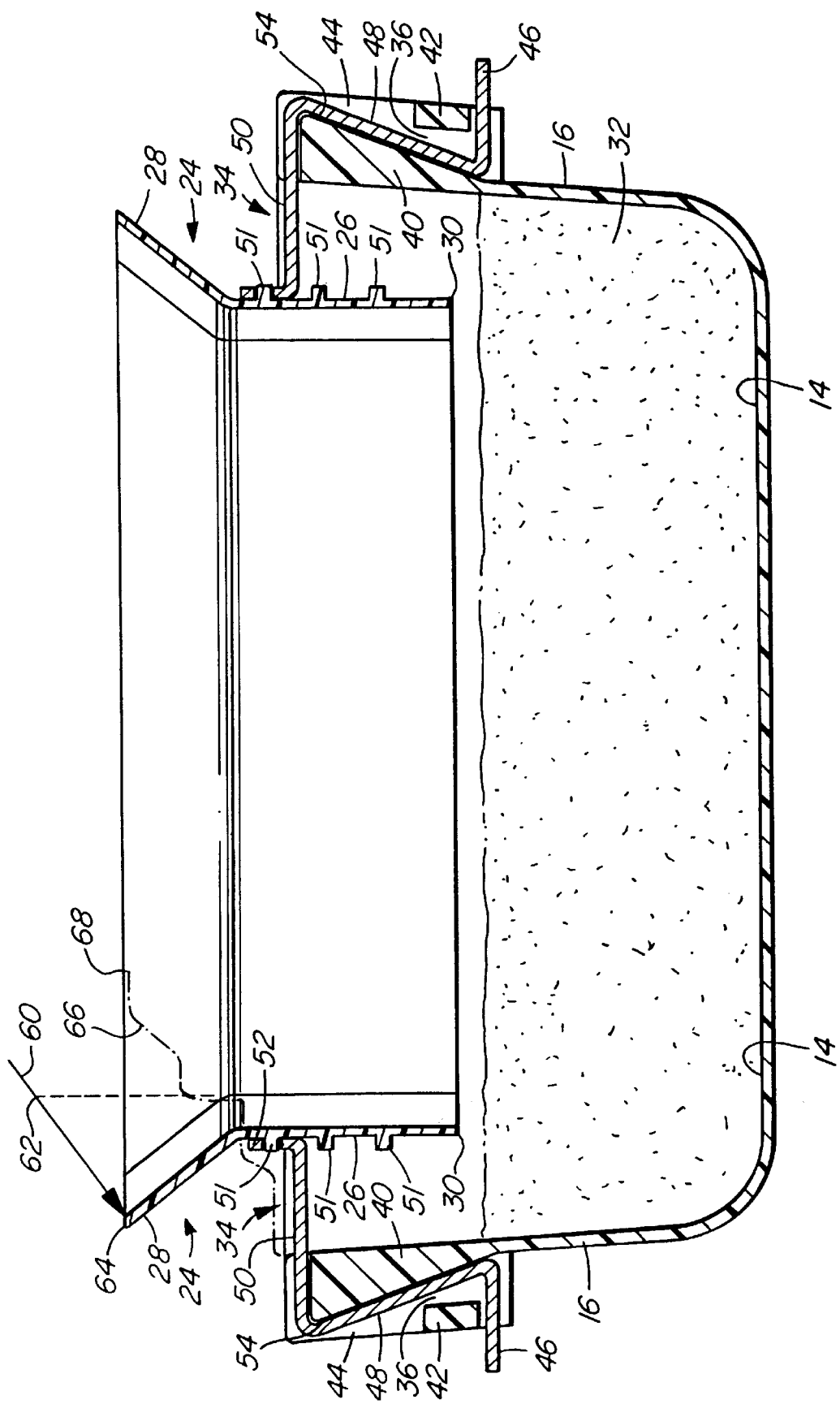
FIG. 5 is a longitudinal sectional view of the container of FIG. 1.

Container 10 further comprises an inner wall generally designated 22 which is coupled to outer wall 16. In a first embodiment shown in FIG. 1, inner wall 22 is subdivided into separate wall sections 24 which are each pivotably connected to an adjacent portion of outer wall 16. Wall sections 24 are independently pivotable between upright and folded positions (FIG. 2). Each inner wall section 24 includes a first panel 26 and a second panel 28. When a wall section 24 is in the upright position as shown in FIGS. 1 and 5, first panel 26 extends in a vertical plane and second panel 28 flares outwardly and upwardly at an angle. In the upright position, the bottom edge 30 of inner wall 22 extends above the level of pet litter 32 placed within container 10 (FIG. 5).

Figure 3:
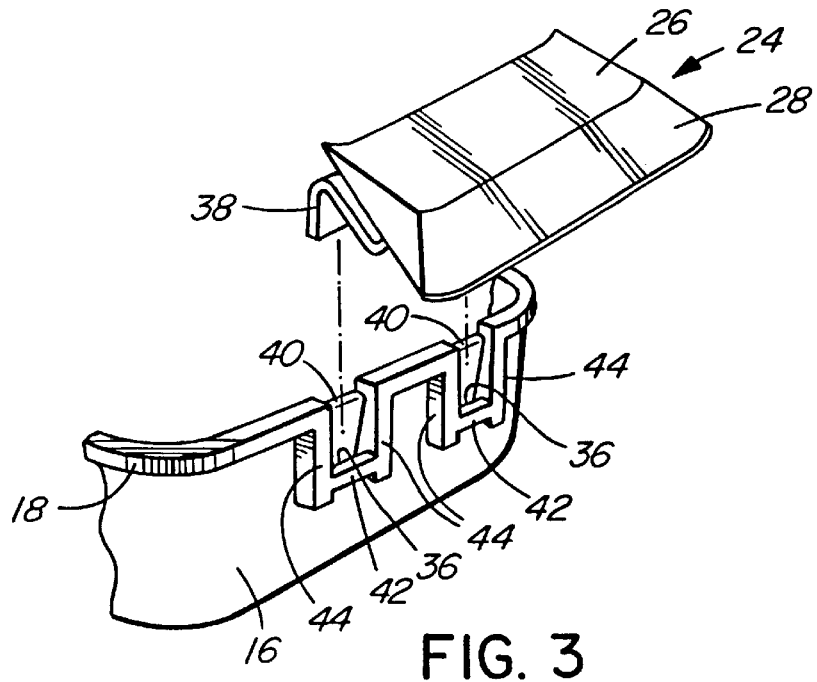
FIG. 3 is an isometric, exploded view showing a coupling means for pivotably coupling an inner wall section to the container outer wall.
Figure 4:
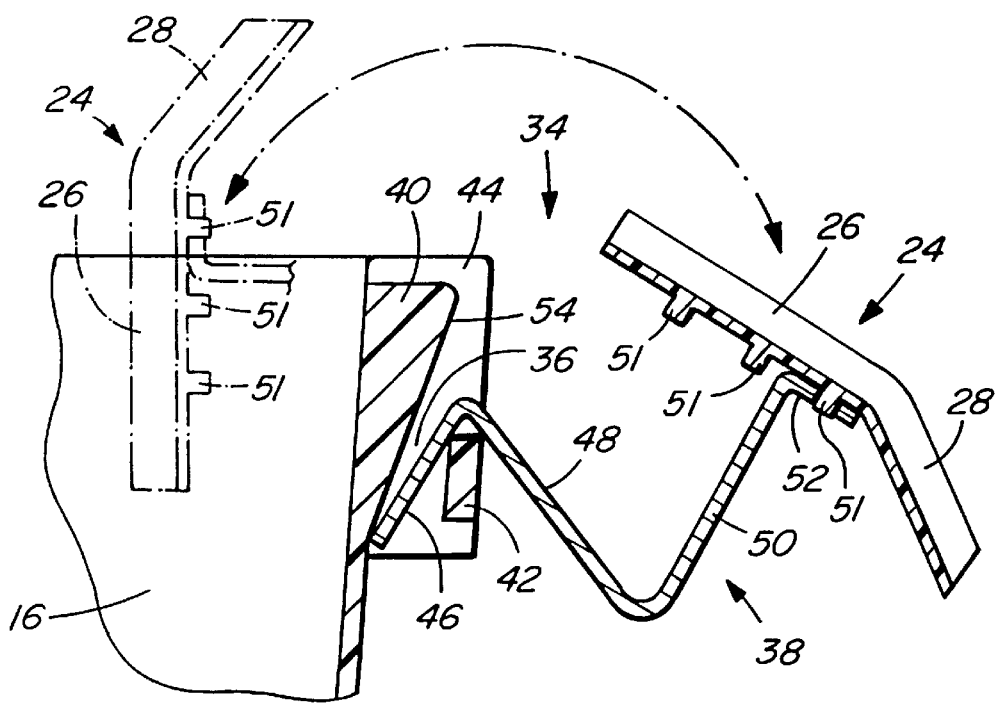
FIG. 4 is a cross-sectional view of the coupling means of FIG. 3 showing the inner wall section moveable between upright and folded positions.

FIGS. 3–5 illustrate "coupling means", namely a latch assembly 34 for pivotably and removably coupling each inner wall section 24 to an adjacent portion of container outer wall 16. In particular, a plurality of female slots 36 are formed on outer surface 16 for receiving corresponding male latches 38 connectable to inner wall sections 26. Each slot 36 is defined between an inner wedge-shaped element 40 and an outer bar 42 which extends between vertical support elements 44. As shown in FIG. 4, each latch 38 is generally Z-shaped and includes a first end segment 46, intermediate segments 48 and 50, and a second end segment 52. In order to removably couple inner wall sections 24 to outer wall 16, a first end segment 46 of each latch 38 is inserted into a corresponding slot 36 (FIGS. 3 and 4) where it engages an outer surface 54 of wedge-shaped element 40. Second end segment 48 is selectively coupled to one of a plurality of spaced-apart fasteners 51 formed on the outer surface of first panel 26 (FIGS. 4 and 5). In the illustrated embodiment fasteners 51 comprise a series of narrow, elongated ribs which protrude in parallel from the inner surface of panel 26.

Latches 38 permit pivotable movement of wall sections 24 between the upright position extending inwardly of outer wall 16 and the folded position extending outwardly of wall 16. As shown best in FIG. 5, in the upright position intermediate section 48 of each latch 38 bears against the outer surface 54 of wedge-shaped element 40 and intermediate section 50 rests on the upper surface of element 40 to support wall section panel 26 in a vertical orientation. The height of each wall section 24 above container bottom surface 14 in the upright position may be adjusted by coupling second end segment 52 of each latch 38 to a selected fastener 51. In the embodiment illustrated in FIG. 5, wall sections 24 are adjusted to the lowermost height extending a short distance above the level of pet litter 32.

In the folded position shown best in FIGS. 2 and 4, latch 38 is stably supported at a position outwardly of wall outer wall 16. In particular, one side of first end segment 46 of latch 38 bears against the outer surface 54 of wedge-shaped element 40 and the other side thereof bears against cross bar 42 at the joinder between first end segment 46 and intermediate segment 48 (FIG. 4).

As will be apparent to someone skilled in the art, other equivalent means for removably and/or pivotably coupling inner wall sections 24 to outer wall 16 may be envisaged.

Figure 6:
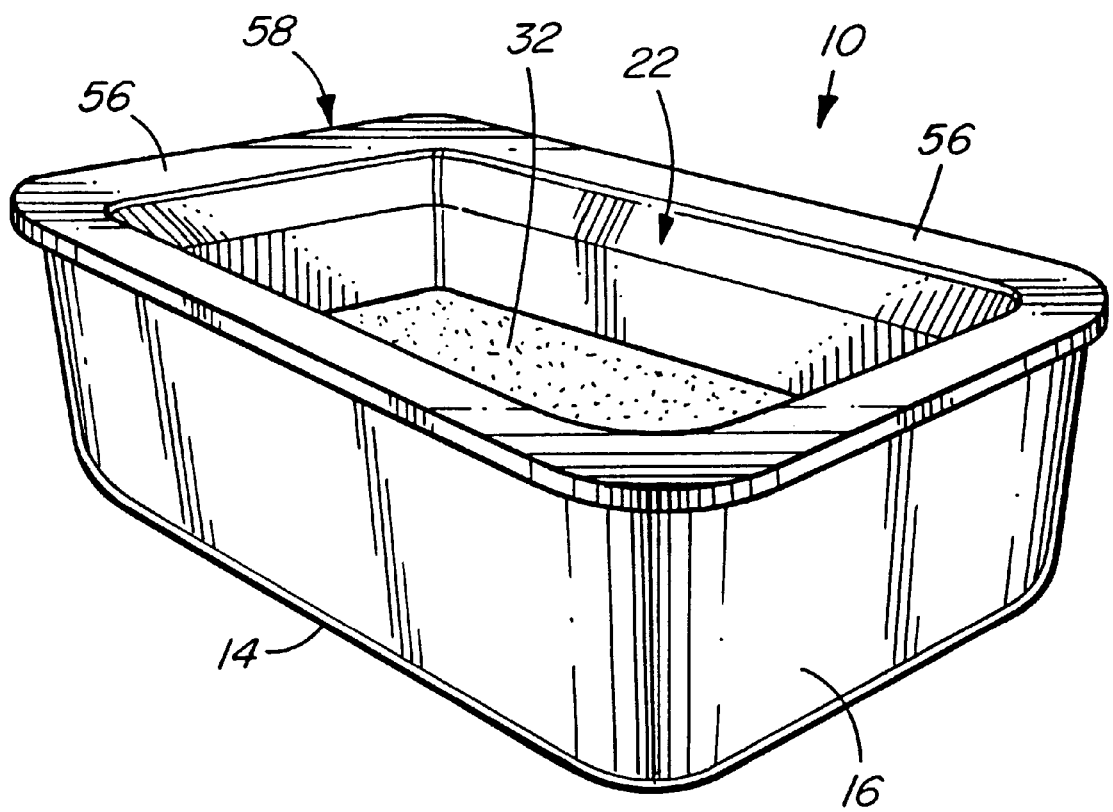
FIG. 6 is an isometric view of an alternative embodiment of the invention comprising a unitary inner wall having a rim which is removably seated on the upper edge of the outer wall.

FIG. 6 illustrates a second embodiment of the invention wherein container inner wall 22 is fixed in the upright position and is not subdivided into separate pivotable and removable sections. Inner wall 22 is connected to an upper edge of outer wall 16 by means of a rim 56 that extends around the perimeter of container 10. In this embodiment the inner wall 16 and rim 56 together form a unitary removable inner wall unit 58. Rim 56 suspends wall 22 at a position above bottom surface 14 and pet litter 32 (i.e. in an elevated position similar to that shown in FIG. 5). In the FIG. 6 embodiment, inner wall 22 is not height adjustable.

If a hood 12 is used, the hood peripheral channel 20 (FIG. 1) snaps onto rim 56 of inner wall unit 58 (rather than outer wall 16). When inner wall unit 58 and hood 12 are assembled in this manner they may be together lifted clear of outer wall 16. This facilitates quick removal of inner wall unit 58 for access to pet litter 32.

In use, container inner wall 22 functions as a splashguard in the upright position to prevent cats or other pets from urinating against or near to the inward facing surfaces of outer wall 16. Container 10 is first filled with pet litter 32 to a level a short distance (typically ½ to 1½ inches below the bottom edge 30 of inner wall 22 (FIG. 5)). In the first embodiment of the invention described above, pivotable inner wall sections 24 may be moved to the folded position to facilitate pouring of clean pet litter 32 into container 10. After spreading pet litter 32 evenly, wall sections 24 are then returned to the upright position of FIG. 1. In the second embodiment described above and illustrated in FIG. 6, inner wall unit 58 and hood 12 may be lifted clear of outer wall 16 (using hood handle 13) to permit filling and spreading of pet litter 32.

If hood 12 is used, hood door opening 15 provides the only means for a pet to enter and exit container 10. Miniature stairs (not shown) may be provided to assist pets in climbing over the raised inner wall 22 at the door opening 15 and into the container 10. However, such stairs are entirely optional and some pets, such as cats, may prefer to simply climb or hop into container 10 through opening 15 without using the stairs.

Although the shape of container 10 is not critical, it is preferable that it be relatively narrow and long as compared to conventional litter boxes. This ensures that, once inside container 10, cats will be forced to situate their bodies lengthwise so that their rear ends are proximate an end wall of container 10. This ensures that the pet litter 32 in the mid-portion of container 10, immediately inside the hood doorway 15, is never soiled and will therefore not be avoided by cats when entering and exiting container 10. The position of doorway 15 in the middle of a side rather than in an end portion of hood 12 provides optimum containment of pet litter 32 which may be flung by cats digging or scratching within container 10 (since the length of the cat's body parallels the length of the container 10).

The length of container 10 has been increased as compared to conventional litter containers to ensure cats have enough room to feel comfortable. Hood 12 has a width larger than the distance between opposed side portions of inner wall 22 to afford cats a larger turning radius for their heads and tails (which extend above the height of inner wall 22).

Cats tend to urinate in the end portions of container 10, either directly into pet litter 32 or against inner wall 22. The spacing between the bottom edge 30 of inner wall 22 is sufficiently small (FIG. 5) that cats are unable to spray underneath inner wall 22 to outer wall 16. Inner wall 22 is also sufficiently high such that cats are also unable to spray over its uppermost edge. As explained above, wall sections 24 are height adjustable to suit the habits of particular cats.

Cats typically urinate at a downward angle as illustrated by urine spray angle 60 shown in FIG. 5. In the applicant's design, the uppermost second panel 28 of each wall section 24 flares outwardly and upwardly (FIG. 1) for optimum urine containment. The outward flaring of second panel 28 in this manner increases the effective height of wall 22. In order for a conventional litterbox having vertical walls to have the same urine containment feature, the height of inner wall 22 would have to be extended as shown by the evenly spaced dashed lines of FIG. 5 to elevation 62. The applicant's design achieves optimum urine containment while still restricting the actual overall height of container 10 to 7½ inches or less for ease of use by most cats. The outward angling of second panel 28 also stops cats from positioning themselves up against the top edge 64 of panel 28, thereby preventing them from urinating over the top of inner wall 22.

By way of comparison, the contour of a conventional litter-box brim 66 is shown in a broken line composed of dots and long dashes in FIG. 5. Brim 66 extends inwardly from outer wall 16 and does not take into account urine spray angle 60. Cats are able to position themselves against the top edge 68 of brim 66 and may urinate over the litterbox wall, especially if the level of litter 32 is high. Other cats may back under brim 66 and urinate against the inward facing surface of the outer wall, resulting in the litter clumping problem described above.

Any urine contacting inner wall 22 of the applicant's invention drips into pet litter 32 within container 10 and is absorbed in the vicinity of wall 22. Inner wall 22 is positioned sufficiently inward of outer wall 16 (preferably about 2 inches) to provide enough distance for complete absorption without wetness contacting the inward facing side of outer wall 16. If a cat urinates against a portion of inner wall 22 it will air dry in a short time unlike a conventional litter box where the urine remains suspended in a solid wet clump of pet litter. The wet clump of pet litter does not dry completely and stubbornly adheres to the inward facing surface of outer wall 16.

Pet litter 32 within container 10 may be periodically cleaned by removing hood 12 and pivoting inner wall sections 24 to the folded position. With respect to the second embodiment of FIG. 6, inner wall 22 may be raised clear of outer wall 16 by lifting hood 12 as described above. Moving inner wall 22 as aforesaid facilitates removal of solid waste and clumped pet litter from the end portions of container 10 as shown in FIG. 2. Since outer wall 16 remains dry, cleaning container 10 is extremely easy. As explained above, inner wall sections 24 may be instantly decoupled from outer wall 16 for convenience to periodically clean and disinfect such parts as necessary.

Containers 10 are stackable for display or shipping purposes. In the case of the first embodiment of the invention, inner walls sections 24 are decoupled from outer wall 16 and packed in the interior of container 10 for rapid assembly by the end user. With respect to second embodiment of FIG. 6, the outer wall 16 unit and inner wall units 58 are also stackable as are hoods 12 (FIG. 1).

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A pet litter container comprising:
   (a) an enclosure for holding pet litter having a bottom surface and an outer wall extending upwardly from said bottom surface; and
   (b) an inner wall coupled to said outer wall and defining an opening, said opening being sufficiently large in size to permit a pet using said container to pass through said opening to a position supported within said enclosure below said inner wall, wherein said inner wall is supported in an upright position within said enclosure laterally inwardly of said outer wall at a location above said bottom surface.

2. The container of claim 1, wherein said inner wall is subdivided into a plurality of separate inner wall sections and wherein each of said sections is pivotably coupled to a portion of said outer wall for movement between said upright position and a folded position.

3. The container of claim 2, wherein each of said inner wall sections is removably coupled to said outer wall.

4. The container of claim 1, wherein the height of said inner wall above said bottom surface is selectively adjustable.

5. The container of claim 1, wherein the shape of said inner wall conforms generally to the shape of said outer wall.

6. The container of claim 1, wherein said inner wall comprises a first panel which extends vertically in said upright position and a second panel which flares outwardly and upwardly in said upright position.

7. The container of claim 2, further comprising coupling means for pivotably coupling one of said inner wall sections to said outer wall, wherein said coupling means comprises:
   (a) a latch having a first end and a second end;
   (b) a fastener on said one of said inner wall sections, said fastener having a plurality of spaced-apart catches for removably engaging said first end of said latch at a selected vertical position; and
   (c) a slot formed on said outer wall for removably receiving said second end of said latch.

8. The container of claim 7, wherein said catches comprise a plurality of elongated ribs extending in parallel.

9. The container of claim 1, further comprising a hood for covering said enclosure, wherein said hood is removably connectable to said outer wall.

10. The container of claim 9, wherein said hood comprises an opening in a side wall thereof to provide access to the interior of said container.

11. The container of claim 2, wherein said inner wall sections are positioned outwardly of said enclosure in said folded position.

12. A pet litter container comprising;
   (a) an enclosure for holding pet litter having a bottom surface and an outer wall extending upwardly from said bottom surface; and
   (b) an inner wall supportable by said outer wall and having a wall surface positionable in an upright position at a location laterally inwardly of said outer wall and above said bottom surface, said inner wall defining an opening sufficiently large in size to permit a pet using said container to pass through said opening to a position supported within said enclosure below said inner wall.

13. The container on claim 12, further comprising a hood for covering said enclosure, wherein said hood is connectable to an outer portion of said enclosure.

14. The container of claim 12, wherein said inner wall is supportable on said outer wall such that said wall surface extends in a generally vertical plane above said bottom surface.

15. A pet litter container comprising:
   (a) an enclosure for holding pet litter having a bottom surface and an outer wall extending upwardly from said bottom surface; and
   (b) an inner wall coupled to said enclosure, wherein said inner wall is supported in an upright position within said enclosure at a location spaced laterally inwardly of said outer wall and above said bottom surface, said inner wall defining an opening sufficiently large in size to permit a pet using said container to pass through said opening to a position supported within said enclosure below said inner wall.

16. A pet litter container comprising:
   (a) an enclosure for holding pet litter having a bottom surface and an outer wall extending upwardly from said bottom surface; said outer wall having an inward facing first wall surface and an upper edge; and
   (b) an inner wall having an upper rim and a second wall surface, wherein said rim is positionable on said upper edge of said outer wall to support said second wall surface laterally inwardly of and adjacent to said first wall surface at a location above and not contacting said bottom surface, said inner wall defining an opening sufficiently large in size to permit a pet using said container to pass through said opening to a position supported within said enclosure below said inner wall.

17. The container of claim 16, further comprising a hood for covering said enclosure, wherein said hood is removably connectable to said upper rim.

18. The container of claim 16, wherein said inner wall comprises a first panel which extends generally vertically and a second panel which flares outwardly and upwardly to meet said upper rim.

19. The container of claim 1, wherein an axis passing through a lower portion of said inner wall in a direction perpendicular to said inner wall intersects said outer wall.

20. The container of claim 1, wherein said inner wall defines an inner enclosure having open top and bottom ends.

21. A pet litter container comprising:
   (a) an outer enclosure for holding pet litter having a bottom surface and an outer wall extending upwardly from said bottom surface; and
   (b) an inner wall coupled to said outer wall, wherein said inner wall is supported in an upright position within said enclosure laterally inwardly and adjacent to said outer wall at a location above said bottom surface, wherein said inner wall defines an inner enclosure having an open top end and an open bottom end, said open bottom end being sufficiently large in size to permit a pet using said container to pass from said inner enclosure to a position within said outer enclosure below said inner wall.

22. A pet litter container comprising;
   (a) an enclosure for holding pet litter having a bottom surface and an outer wall extending upwardly from said bottom surface; and
   (b) an inner wall coupled to said outer wall, wherein said inner wall is supported in an upright position within said enclosure laterally inwardly of said outer wall at a location above said bottom surface, and wherein said inner wall is subdivided into a plurality of separate inner wall sections each of said sections being pivotably coupled to a portion of said outer wall for movement between said upright position and a folded position.

* * * * *